Patented Aug. 20, 1940

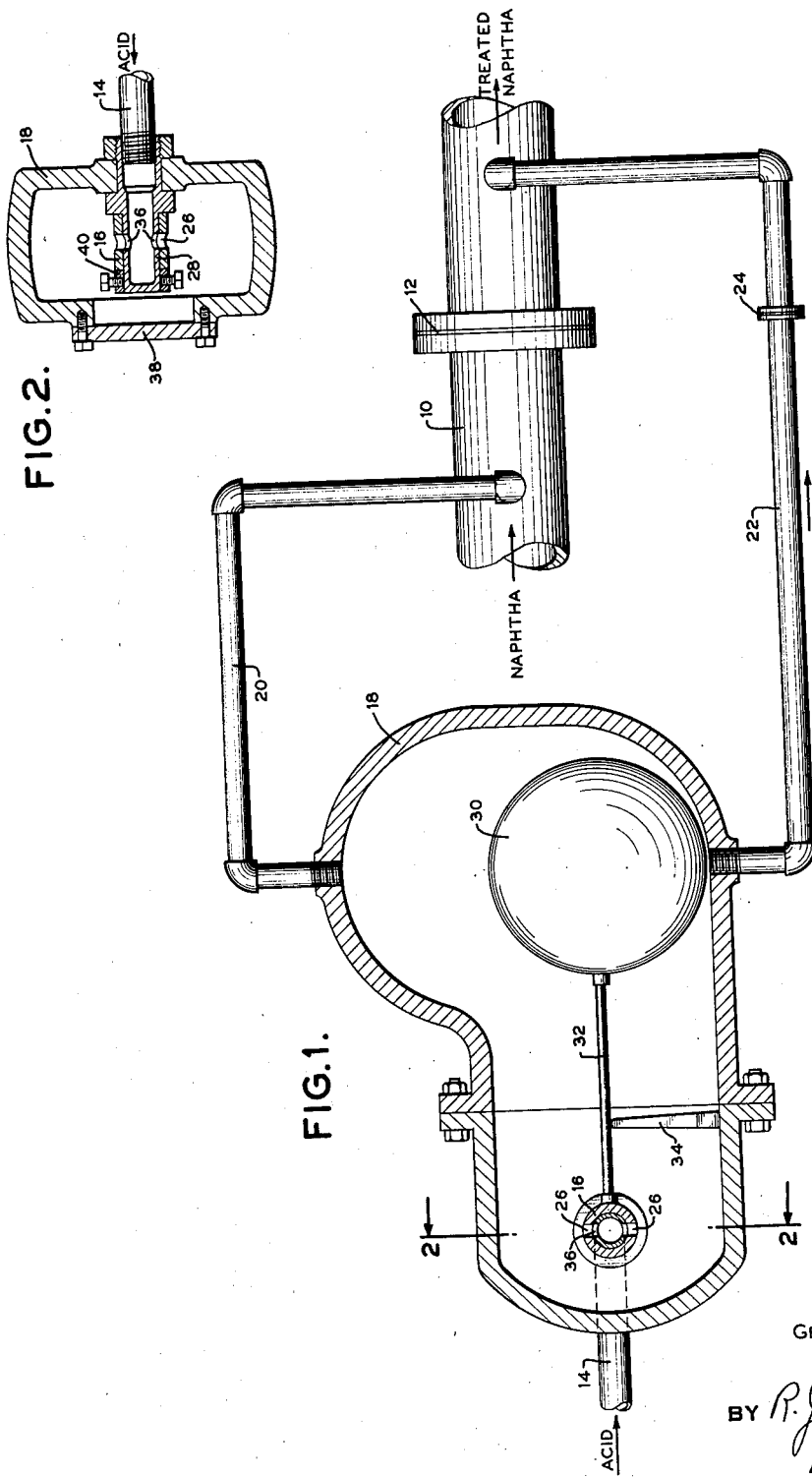

2,212,374

UNITED STATES PATENT OFFICE 2,212,374

LIQUID PROPORTIONING DEVICE

George Louis, Fillmore, Calif., assignor to The Texas Company, New York, N. Y., a corporation of Delaware Application June 30, 1937, Serial No. 151,315

6 Claims. (Cl. 137—165)

This invention relates to liquid proportioning devices and more particularly to a device for continuously treating one liquid such as naphtha with a proportionate amount of another liquid such as sulfuric acid. The primary object of the invention is the provision of a device which will operate entirely automatically and effectively in response to slight changes in the rate of flow of the liquid to be treated. Other objects are to provide such a device which will consist of but a few inexpensive parts and which will be self-cleaning.

Although several methods and types of apparatus have been used for proportioning liquids, most of these have disadvantages which render them unfit for use where extreme accuracy is needed. The use of separate proportioning pumps driven from the same source or connected so that proportionate amounts of the liquids will be pumped is, of course, expensive in first cost and also in upkeep since the many moving parts may easily get out of order. Most of the devices which depend upon a difference in specific gravity between the two liquids are delicate and difficult to maintain in order.

In accordance with the present invention, the primary line, i. e., the pipe containing the liquid to be treated, is provided with an orifice dividing the line into an "upstream" side and a "downstream" side. The secondary line, i. e., the line supplying the treating liquid is connected to the downstream side of the primary line. A chambered vessel is connected in the secondary line and is provided with a float controlled valve for maintaining substantially constant the level of the treating liquid in the vessel. It is understood that the treating liquid is of greater specific gravity than the liquid to be treated. The outlet for the treating liquid is disposed at the bottom of the vessel and a conduit connects the top of the vessel with the upstream side of the primary line. The pressure in the vessel will thus be the same as that in the upstream side of the primary line, and differential pressure variations in the primary line caused by varying rates of flow will thus be transmitted to the vessel, and proportionate amounts of the treating liquid will be forced from the vessel into the downstream side of the primary line in response to the then prevailing rate of flow through the primary line. The vessel is preferably positioned at an elevation such that the liquid level or interface therein between the liquid to be treated and the heavier treating liquid is maintained at a point corresponding to the elevation of the center of the primary line.

For a better understanding of the invention, reference may be had to the accompanying drawing in which Figure 1 is an elevation partly in section showing an embodiment of the invention, while Figure 2 is a sectional side elevation taken on the line 2—2 of Figure 1.

Referring to the drawing, a "primary" liquid line or conduit 10 through which flows a liquid to be treated such as naphtha is provided with a suitable orifice plate 12. A "secondary" liquid line 14 for the treating liquid which may be sulfuric acid is connected through a sleeve valve 16 to the interior of a chambered vessel 18, and the top of this vessel 18 is connected by means of conduit 20 to the upstream side of the pipe line 10. The bottom of the vessel 18 is connected by means of a conduit or treating line 22 to the downstream side of the pipe line 10 and in the conduit 22 is disposed a suitable orifice plate 24. The valve 16 is in the form of a sleeve having oppositely disposed ports 26 and the sleeve is mounted for rotary or oscillatory movement on a pipe extension 28. The extension 28 is suitably secured to one side wall of the vessel 18, as shown in Figure 2, and is connected to the end of the acid supply conduit 14. A duo-gravity ball float 30 is attached by means of rod 32 to the valve sleeve 16 and is shown in the drawing as resting upon a suitable supporting post 34. The pipe extension 28 is also provided with oppositely disposed ports 36 and the device is arranged so that when the float 30 is in its lowermost position, as shown in the drawing, the port 26 and 36 will be completely aligned or, in other words, the valve will be in its full open position. A plate or cover 38 suitably secured over an opening in the opposite side wall of the vessel 18 serves to afford access to the valve 16 and its associated structure. A ring member 40 is secured to the outer end of the pipe extension 28 by means of suitable set screws for maintaining the valve sleeve 16 in proper position.

In operation, the lower portion of the vessel 18 will contain the treating liquid such as acid and the remainder or upper portion will contain the liquid to be treated, such as naphtha. The acid and naphtha having different specific gravities will remain in the lower and upper portions, respectively, of the vessel 18, and the vessel is preferably disposed at a height such that the acid-naphtha level or interface will be maintained by the float-controlled valve 16 at a point corresponding to the elevation of the center of the naphtha line 10. As the rate of flow of the naphtha through the line 10 fluctuates, the differential pressures at opposite sides of the orifice plate 12 will be exerted through the conduits 20 and 22, and the variations in pressure thus exerted in the upper portion of the vessel 18 will cause corresponding variations in the amount of acid flowing out of the lower portion of the vessel through the conduit 22 and orifice 24. Thus, in case the rate of flow of naphtha through the line 10 should increase a higher pressure will be exerted through the conduit 20, and this pressure acting through the naphtha in the upper part of the vessel 18 will cause a proportionately greater amount of acid to flow out of the vessel through the conduit 22, past the orifice plate 24 and into the downstream side of the line 10. As the acid flows out of the vessel 18 the float 30 will fall, thus opening the valve 26 to a greater extent, allowing more acid to enter the vessel whereupon the float will again rise to a point substantially midway between the top and bottom of the vessel. The position of the interface of the acid-naphtha level will then remain constant until the next fluctuation in the rate of flow of the naphtha through the line 10.

It will be seen that the proportioner has but one moving part and cost of maintaining the device is therefore very low. When it is desired to clean the vessel 18 it is merely necessary to close a valve, not shown, in the acid supply line 14 whereupon the acid in the chamber will be displaced by naphtha entering through conduit 20 and which will flow through the vessel and outwardly through the conduit 22.

Obviously many modifications and variations of the invention may be made without departing from the spirit and scope thereof, and therefore only such limitations should be imposed as are indicated by the appended claims.

I claim:

1. In combination with a primary liquid supply line containing an orifice plate, and a secondary liquid supply line, said secondary line connected to said primary line at the downstream side of said plate and the liquid in said secondary line being of greater specific gravity than the liquid in said primary line, a proportioning device in said secondary line comprising a closed, chambered vessel, a valve for controlling the amount of secondary liquid passing into said vessel, a connection between the top of said vessel and the upstream side of said orifice for maintaining the pressure in said vessel equal to the pressure in the upstream side of said primary line, and means in said vessel for controlling said valve, said means comprising a duo-gravity float responsive to the level of the interface between the primary and secondary liquids in said vessel.

2. In combination with a primary liquid line and a secondary liquid line, the liquid in said secondary line being of greater specific gravity than that in said primary line, an orifice plate in said primary line, said secondary line being connected to said primary line at the downstream side of said orifice, a closed, chambered vessel connected in said secondary line, a conduit connecting the top of said vessel with the upstream side of said primary line, a valve in said vessel at the inlet of said secondary line to said vessel, and a duo-gravity float for controlling said valve, said float being responsive to the level of the interface between said primary and said secondary liquids in said vessel.

3. In combination with a liquid line containing a liquid to be treated, said line being provided with an orifice plate dividing it into "upstream" and "downstream" sides, a closed, chambered vessel disposed at substantially the same elevation as the portion of the line containing said orifice plate, a source of supply of treating liquid connected to said vessel, said treating liquid being of greater specific gravity than the liquid to be treated, a conduit connecting the bottom of said vessel with the downstream side of said primary line, a conduit connecting the top of said vessel with the upstream side of said primary line, a valve in said vessel at the point of inlet of said treating liquid and a duo-gravity float connected to open and close said valve in accordance with the fall and rise respectively of the level of the treating liquid in said vessel.

4. In combination with a primary liquid supply line containing an orifice plate, and a secondary liquid line, said secondary line connected to said primary line at the downstream side of said plate and the liquid in said secondary line being of greater specific gravity than the liquid in said primary line, means for supplying said secondary liquid to said primary line in a predetermined proportion comprising a closed, chambered vessel connected in said secondary line, the portion of the secondary line which is connected to said primary line being connected to the lower part of said vessel and containing an orifice plate, means connecting the upper part of said vessel with the upstream side of said primary line so that variations in pressure in said primary line will cause proportionate amounts of said secondary liquid to flow from said vessel into said primary line, and means for maintaining the level of secondary liquid in said vessel substantially constant comprising a valve in the secondary liquid inlet to said vessel and a duo-gravity float connected to open or close said valve in accordance with the fall or rise respectively of the secondary liquid level in said vessel.

5. A device for continuously adding in a predetermined proportion a treating liquid to a liquid to be treated comprising, in combination with a liquid line containing a liquid to be treated, said line being provided with an orifice plate dividing it into "upstream" and "downstream" sides, a closed, chambered vessel disposed at substantially the same elevation as said liquid line, a treating liquid supply line connected to said vessel, said treating liquid being of greater specific gravity than the liquid to be treated, a conduit connected to the bottom of said vessel and to the downstream side of said first mentioned liquid line, a conduit connecting the upstream side of said liquid line with the upper portion of said vessel for maintaining the pressure in said vessel the same as that in the upstream side of said first mentioned liquid line, means for maintaining a predetermined amount of treating liquid in said vessel comprising a valve in the treating liquid supply line to said vessel and a duo-gravity float connected to actuate said valve in accordance with the position of the liquid interface in said vessel between the treating liquid and the liquid supplied to the upper portion of said vessel through said last mentioned conduit.

6. A device for continuously adding in a predetermined proportion a secondary liquid to a primary liquid comprising, in combination with a primary liquid supply line containing an orifice plate, and a secondary liquid line also containing an orifice plate, said secondary line connected to said primary line at the downstream side of said first orifice plate and the liquid in said secondary line being of greater specific gravity than the liquid in said primary line, a proportioning device in said secondary line at the upstream side of the second named orifice plate comprising a closed, chambered vessel, a valve for controlling the amount of secondary liquid passing into said vessel, a connection between the top of said vessel and the upstream side of said first named orifice plate for maintaining equal pressures in the upper part of said vessel and in the upstream side of said primary line, and a duo-gravity float in said vessel connected to actuate said valve in accordance with the position of the liquid interface in said vessel, the arrangement being such that differential pressure changes in said primary line will cause corresponding pressure changes in said vessel to increase or decrease the flow of secondary liquid from said vessel into the downstream side of said primary line, said float actuating said valve to maintain constant the amount of secondary liquid in said vessel.

GEORGE LOUIS.